April 19, 1949.  F. M. MOTTET  2,467,983
GLASS CUTTING APPARATUS
Filed Oct. 22, 1945  6 Sheets-Sheet 3
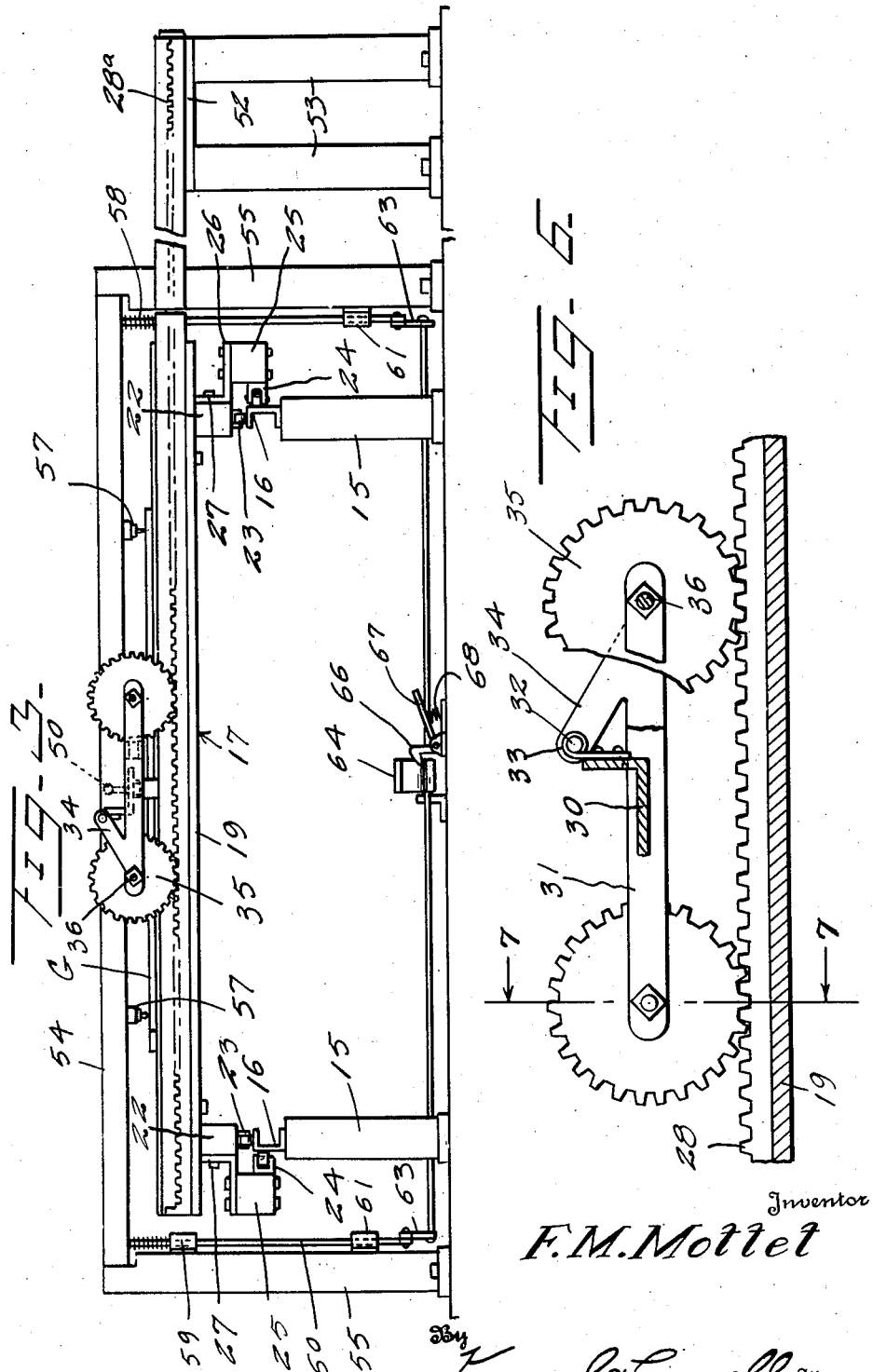
Inventor
F. M. Mottet
By Kimmel & Crowell Attorneys

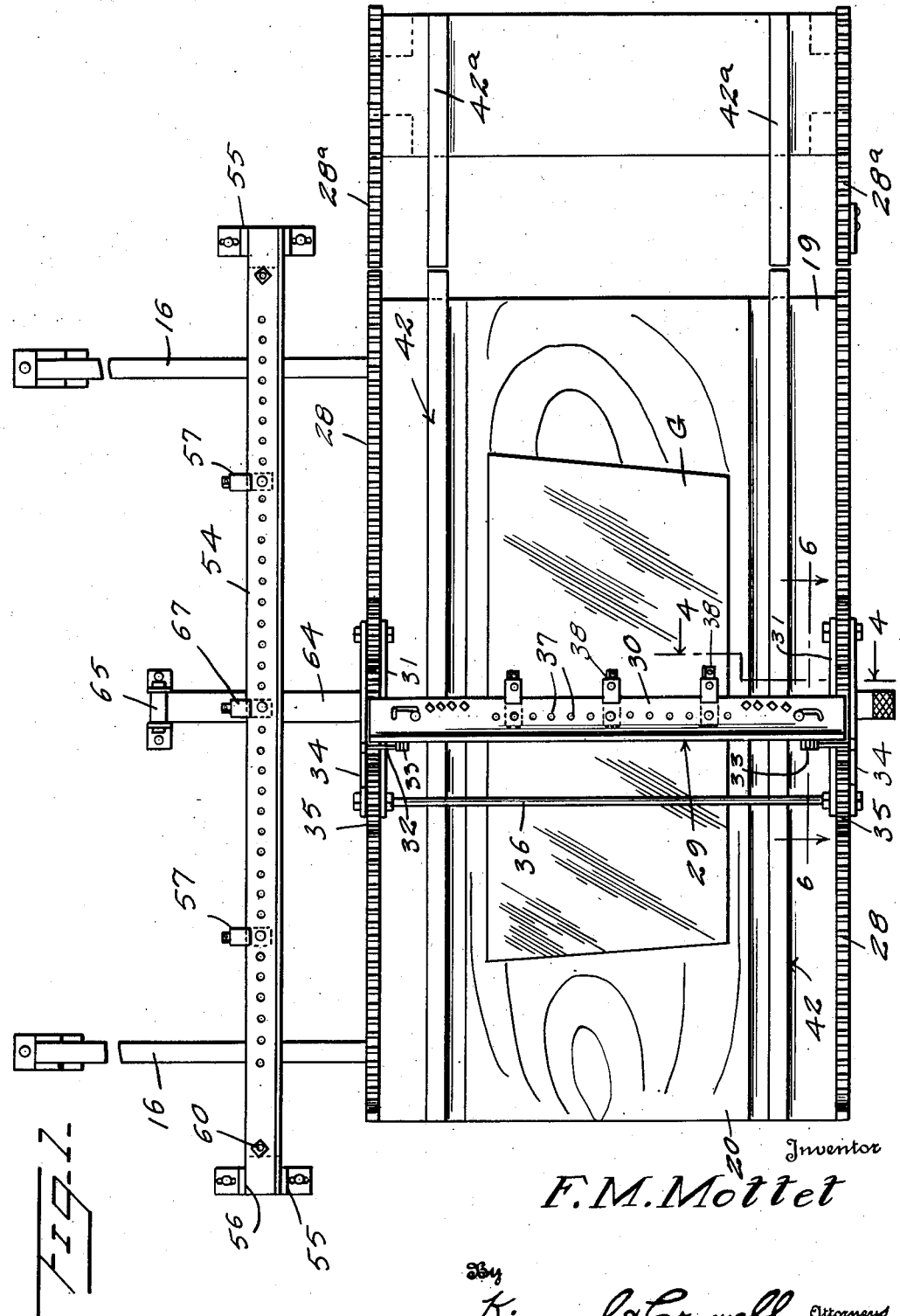

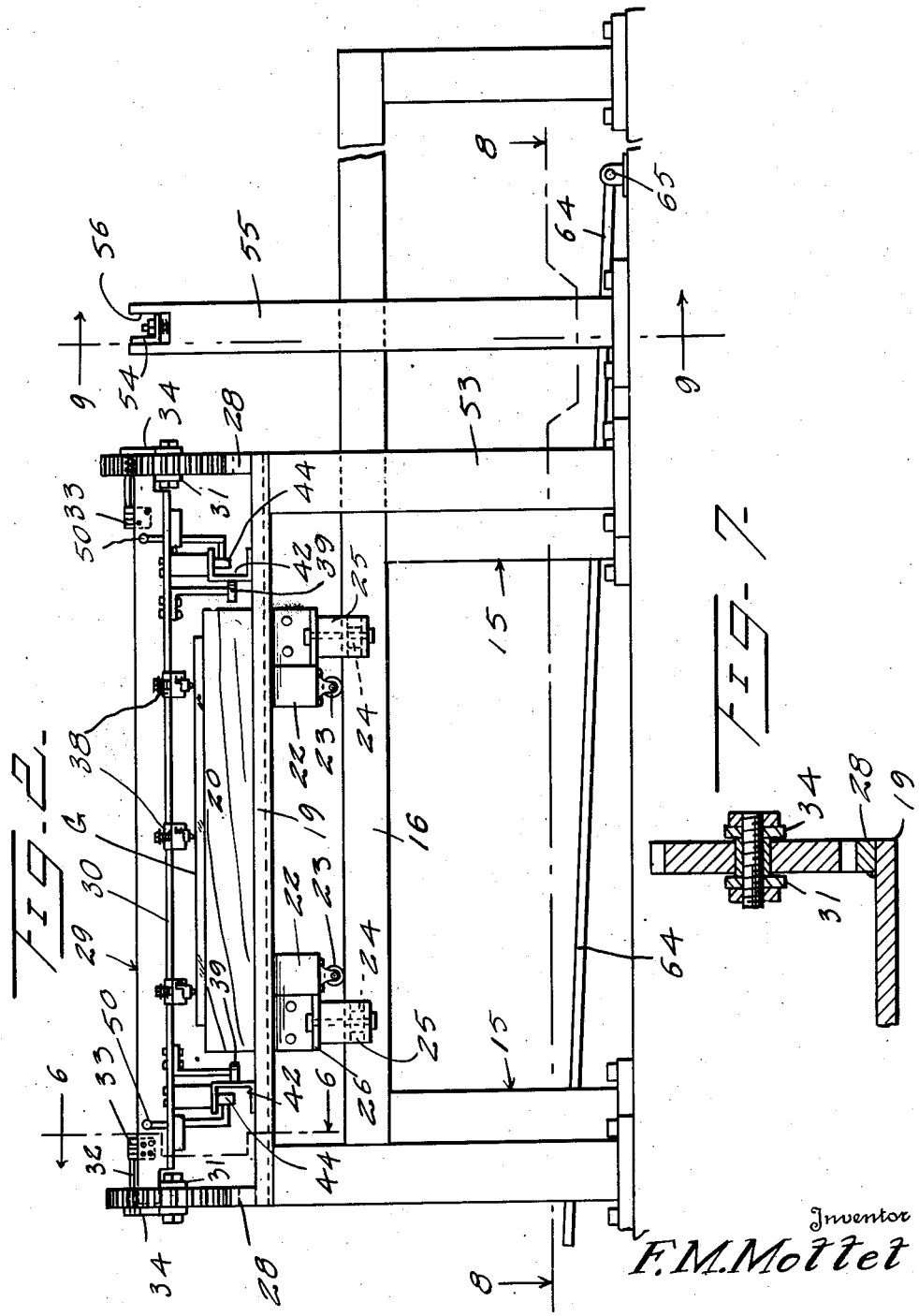

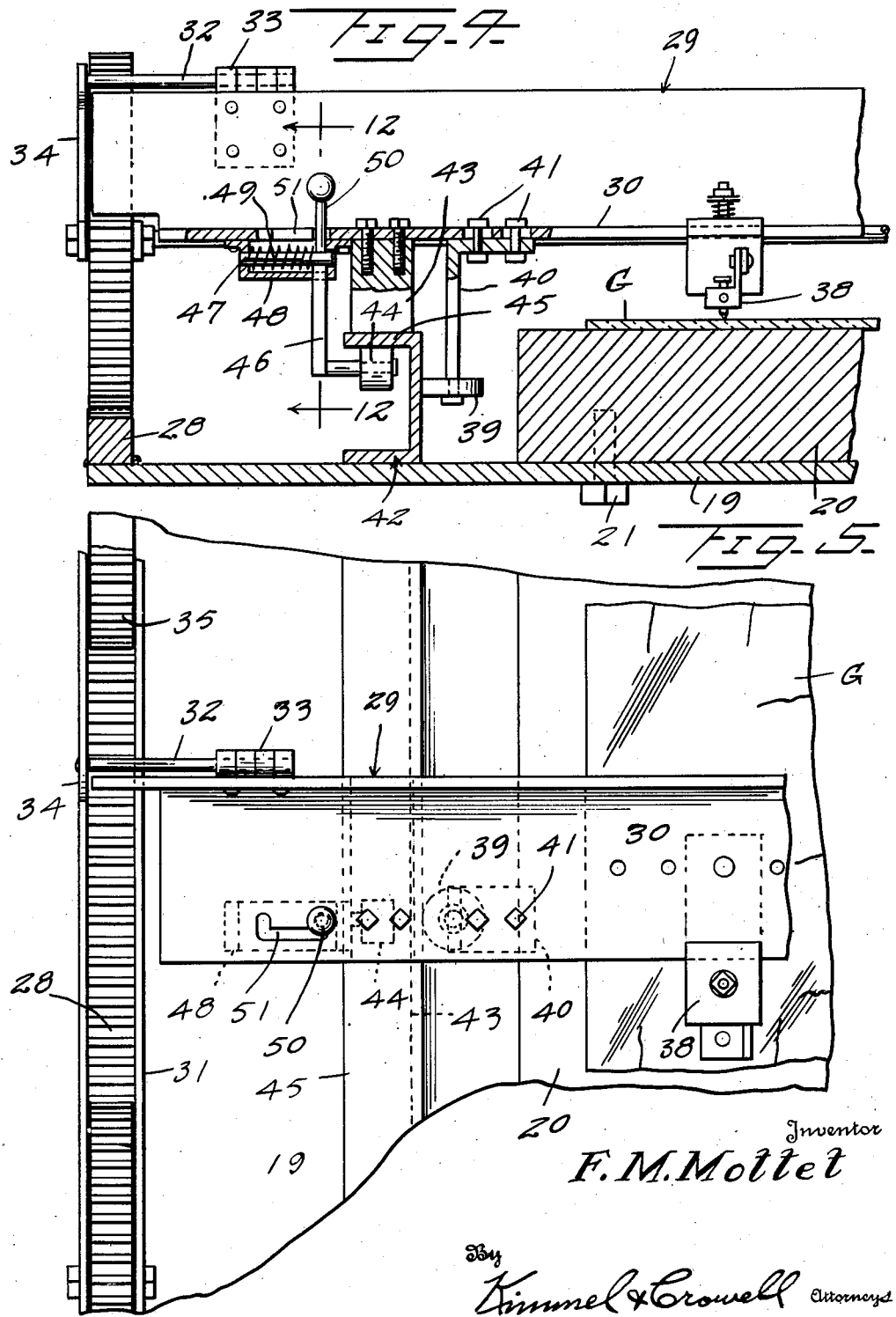

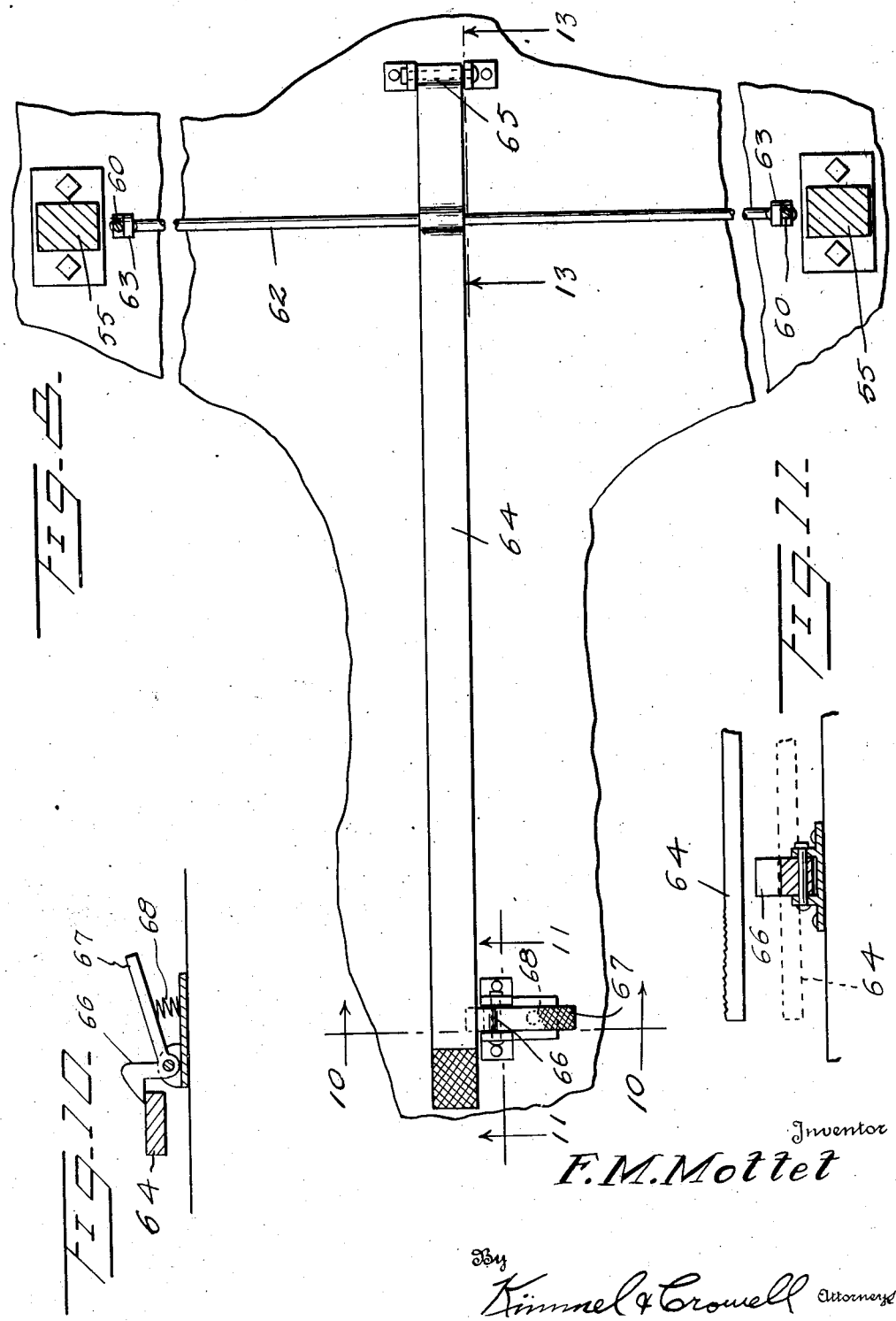

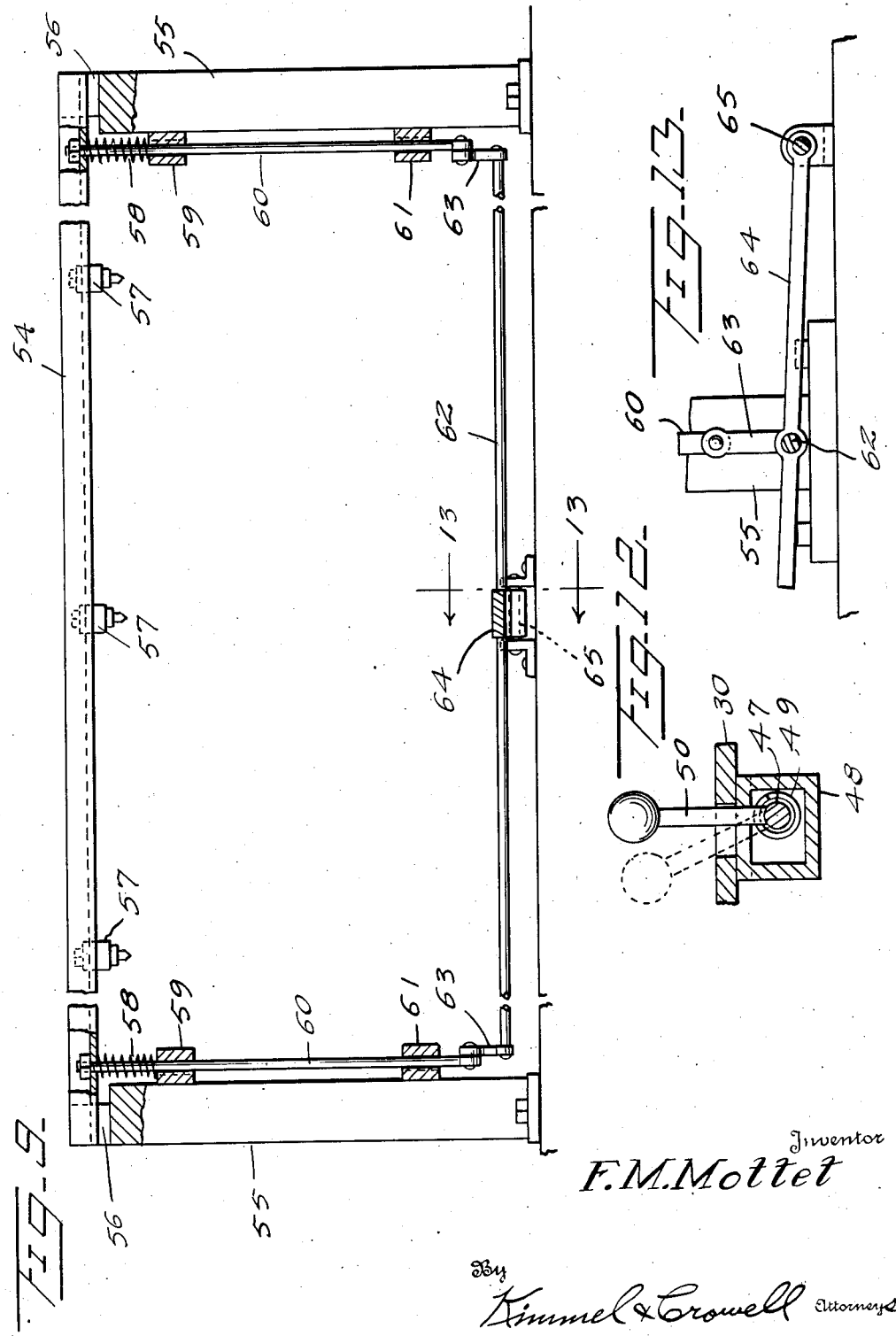

Patented Apr. 19, 1949

2,467,983

UNITED STATES PATENT OFFICE 2,467,983

GLASS CUTTING APPARATUS

Fernand M. Mottet, Park, W. Va.

Application October 22, 1945, Serial No. 623,735

2 Claims. (Cl. 33—32)

This invention relates to glass cutting apparatus.

An object of this invention is to provide an improved glass cutting device wherein the glass may be cut lengthwise and crosswise.

Another object of this invention is to provide a device of this kind which includes a supporting table having lengthwise movable cutters mounted thereon, and a second series of cutters supported laterally of the table and beneath which the table is adapted to move.

A further object of this invention is to provide in a device of this kind an improved means for supporting the movable cutters so that they may be lowered in one movement of the cutter carriage to operative position, and may be raised at the end of the movement of the cutter carriage to inoperative position.

To the foregoing objects and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention, as claimed.

In the drawings:

Figure 1 is a detail top plan of a glass cutting device constructed according to an embodiment of this invention.

Figure 2 is a detail end elevation of the device.

Figure 3 is a detail front elevation of the device.

Figure 4 is a fragmentary sectional view taken on the line 4—4 of Figure 1.

Figure 5 is a fragmentary plan view of the movable cutter bar and table.

Figure 6 is a fragmentary sectional view taken on the line 6—6 of either Figure 1 or Figure 2.

Figure 7 is a sectional view taken on the line 7—7 of Figure 6.

Figure 8 is a fragmentary sectional view taken on the line 8—8 of Figure 2.

Figure 9 is a sectional view taken on the line 9—9 of Figure 2.

Figure 10 is a sectional view taken on the line 10—10 of Figure 8.

Figure 11 is a sectional view taken on the line 11—11 of Figure 8.

Figure 12 is a sectional view taken on the line 12—12 of Figure 4.

Figure 13 is a fragmentary sectional view taken on the line 13—13 of Figure 8.

Referring to the drawings the numeral 15 designates upright posts or standards which have mounted on the upper ends thereof a pair of channel shaped track members 16. The channel members 16 face inwardly and have movably mounted thereon a table structure generally designated as 17.

The table structure 17 includes a flat body or plate 19 having a table member 20 secured on the upper side thereof by fastening members 21. The plate 19 has secured to the lower side thereof, adjacent the opposite lengthwise edges, pairs of depending blocks 22 on which are mounted rollers 23 which engage on the upper sides of the tracks 16. The table structure 17 is held against lateral movement while permitting lengthwise movement of the track members 16, by means of pairs of rollers 24 secured to blocks 25.

The blocks 25 are dependingly carried by angle members 26 secured by fastening members 27 to the roller supporting blocks 22. The rollers 24 engage the outer sides of the channel members 16, as shown more clearly in Figure 3.

The plate 19 has fixed to the opposite lengthwise edges thereof a pair of gear rack members 28.

A movable cutter carriage, generally designated as 29, engages the racks 28 and is movable lengthwise of the table structure 17. The cutter carriage 29 includes a transversely disposed angle bar 30, which is pivotally supported between a pair of lengthwise extending bars 31 by means of pivot members 32 which engage through hinge members 33 carried by the vertical side of the angle member 30.

The pivot member 32 is mounted in a supporting bar 34 which is fixed relative to the side bar 31. A pair of gear members 35 are rotatably carried by each side bar 31, and preferably a transversely extending tie rod 36 connects the inner pairs of the side bars 31 together. The cutter bar 30 is provided with a plurality of spaced apart openings 37 whereby a plurality of diamond cutter members 38 may be adjusted lengthwise of the bar 30.

The bar 30 is held against lateral movement with respect to the table structure 17 by means of a pair of rollers 39 which are rotatably supported by brackets 40, secured by fastening members 41 in depending relation with respect to the horizontal side of the angle member 30.

Each roller 39 engages the inner side of a lengthwise extending channel member 42, which is secured to the upper side of the plate 19 outwardly from the lengthwise edges of the table member 20. The channel members 42, one of which is shown in Figure 4, face outwardly and the cutter bar 30 is provided with a depending slide member 43, which slidably engages the upper flange of the angle member 42.

In order to provide for holding the cutter bar 30 in lowered operative position, or in raised inoperative position, I have provided a roller 44, which engages the lower side of the upper flange 45 of the channel member 42. The roller 44 is rotatably carried by an L-shaped bracket member 46 which is formed with a horizontal extending slide pin 47 slidably engaging in a housing 48 which is fixed to the lower horizontal side of the cutter supporting bar 30.

The roller 44 is constantly urged inwardly to a position beneath the flange 45 by means of a spring 49. The spring 49 engages about the slide pin 47, and bears against the upper end of the L-shaped rack supporting member 46. An upwardly extending handle 50 extends from the lower supporting member 46 through a substantially U-shaped slot 51, which is formed in the bar 30.

When it is desired to raise the cutter supporting bar 30 to inoperative position, the handle 50 is moved outwardly so as to thereby disengage the roller 44 from beneath the upper flange member 45. The cutter bar 30 may then be raised on the hinge structure 32 and 33, and the rollers 44 may then be released so that they will engage on the upper side of the flange 45. When the rollers 44 are on the upper side of the flange 45 the cutters 38 will be raised from a glass plate G, which is resting on the upper side of the table member 20.

A pair of auxiliary gear racks 28a are disposed in alinement with the racks 28, and are supported on a frame structure including a horizontal member 52 carried by uprights 53. A pair of auxiliary channel members 42a are mounted on the horizontal member 52, and are disposed in alinement with the channel members 42. The confronting ends of the racks 28, and the channel members 42, with respect to the racks 28a, and the channel members 42a, are disposed in slightly spaced apart relation so that the table structure 17 may be moved lengthwise of the channel members 16.

A vertically movable cutter bar 54 is slidably mounted on a pair of uprights or standards 55 having slots 56 in their upper ends. The bar 54 has cutter members 57 adjustably mounted with respect to the length thereof for cutting the desired scores in the surface of the glass as the carriage structure 17 is moved lengthwise of the tracks or channel members 16. The bar 54 is constantly urged upwardly by means of springs 58 which engage the lower side of the bar 54, and bear against a guide block 59 fixed adjacent the upper portion of an upright 55.

A pair of vertically disposed rods 60 are secured at their upper ends to the bar 54 adjacent the opposite ends thereof, and slidably engage through the guide members 59. A second guide member 61 is disposed adjacent the lower end of each upright 55.

A transversely extending connecting bar 62 is disposed between the lower end portions of the uprights 55 and is connected to the lower ends of the bars 60 by means of links 63. A rock lever 64 which is rockably mounted as at 65 at one end thereof pivotally engages the connecting bars 62 and extends forwardly, as shown in Figure 2.

The forward end portion of the lever 64 is adapted to be latched in its lowered position by means of a spring-pressed dog 66 carried by a rock lever or pedal 67. A spring 68 constantly urges the lever or pedal 67 upwardly so as to maintain the dog 66 in the path of the swinging movement of the lever 64. When the lever 64 is in its lowered position the lever will be latched, as shown more clearly in Figure 10.

In the use and operation of this device when it is desired to score the glass G, lengthwise thereof, the carriage 29 is moved to the right, as viewed in Figure 1. The carriage 29 may then be pulled either manually or by a draw bar lengthwise of the rack members 28 until the cutters 38 score the glass G for the entire length thereof.

When it is desired to move the carriage 29 back to its supporting position the cutter bar 30 may be elevated by unlatching the handle 50 by outward movement thereof so as to withdraw the rollers 44 from beneath the flanges 45 of the channel members 42. With the rollers 44 in their outer released position the cutter bar 30 may be raised and the handles 50 released whereupon springs 49 will move the roller supporting members 46 inwardly until the rollers 44 engage on the upper side of the flanges 45. In this position of the cutter bar 30 the cutters 38 will be raised from the surface of the glass 60 so that the carriage 29 may be freely moved back to its supporting position.

In the event it is desired to cut the glass transversely the carriage 29 is shifted onto the rack extensions 28a. The table structure 17 is then moved forwardly on the channel members 16, and at this time the lever 64 may be lowered and latched by the latch member 66. This will lower the cutters 57 carried by the cutter bar 54 to their operative or cutting position.

After the table structure 17 has passed beneath the cutters 57 the lever 64 may be unlatched by depressing the pedal 67. The cutter bar 54 will thereupon be raised by the springs 58 so that the carriage structure 17 may be returned to its supporting position with the racks 28 in alinement with the rack extensions 28a.

What is claimed is:

1. Glass cutting apparatus comprising a table, a cutter carriage above said table, means supporting said carriage for movement lengthwise of said table, a cutter bar pivotally carried by said carriage above said table, a pair of channel members disposed one on each lengthwise edge of said table and fixed relative thereto, and spring-pressed latching means carried by said cutter bar engaging said channel members, said latching means in one position thereof maintaining said cutter bar in an upper inoperative position, and in another position thereof maintaining said cutter bar in a lower operative position, said latching means including a roller dependingly carried by said cutter bar and engageable within a channel member when said cutter bar is in operative position.

2. Glass cutting apparatus comprising a table, a cutter carriage above said table, means supporting said carriage for movement lengthwise of said table, a cutter bar pivotally carried by said carriage above said table, a pair of channel members disposed one on each lengthwise edge of said table and fixed relative thereto, and spring-pressed latching means carried by said cutter bar engaging said channel members, said latching means in one position thereof maintaining said cutter bar in an upper inoperative position, and in another position thereof maintaining said cutter bar in a lower operative position, said latching means including a pair of rollers, an L-shaped supporting member for each roller, and spring-pressed means carried by said cutter bar constantly urging said supporting member toward said table.

FERNAND M. MOTTET.

REFERENCES CITED

The following references are of record in the file of this patent:

UNITED STATES PATENTS

| Number | Name | Date |
|---|---|---|
| 1,117,736 | Whittemore | Nov. 17, 1914 |
| 1,140,143 | Falvey | May 18, 1915 |
| 1,259,687 | Waterloo | Mar. 19, 1918 |
| 1,407,736 | Deputy | Feb. 28, 1922 |
| 1,876,612 | Chiotti | Sept. 13, 1932 |
| 1,970,919 | Rosin | Aug. 21, 1934 |
| 2,084,576 | Drake | June 22, 1937 |